(12) United States Patent
Koesters et al.

(10) Patent No.: US 8,557,887 B2
(45) Date of Patent: Oct. 15, 2013

(54) PROCESS FOR PRODUCING RIGID POLYURETHANE FOAMS

(75) Inventors: Michael Koesters, Lotte (DE); Gunnar Kampf, Stemwede-Haldem (DE); Roland Fabisiak, Brockum (DE); Olaf Jacobmeier, Luebbecke (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/090,562

(22) Filed: Apr. 20, 2011

(65) Prior Publication Data

US 2011/0263736 A1 Oct. 27, 2011

Related U.S. Application Data

(60) Provisional application No. 61/327,139, filed on Apr. 23, 2010.

(51) Int. Cl.
*C08G 18/48* (2006.01)
*C08G 18/16* (2006.01)
*C08G 18/00* (2006.01)
*C08J 9/00* (2006.01)

(52) U.S. Cl.
USPC ............ 521/170; 521/99; 521/106; 521/155; 521/172; 521/174

(58) Field of Classification Search
USPC .......................................... 521/170, 174, 172
See application file for complete search history.

(56) References Cited

U.S. PATENT DOCUMENTS

| 4,752,637 | A * | 6/1988 | Israel | 524/702 |
|---|---|---|---|---|
| 6,887,913 | B2 * | 5/2005 | Hotta et al. | 521/170 |
| 2007/0060660 | A1 * | 3/2007 | Javarone | 521/131 |
| 2007/0225392 | A1 * | 9/2007 | Shieh | 521/131 |

FOREIGN PATENT DOCUMENTS

| WO | WO 99/00559 | | 1/1999 |
|---|---|---|---|
| WO | WO 2005/090432 | A1 | 9/2005 |

OTHER PUBLICATIONS

U.S. Appl. No. 13/299,128, filed Nov. 17, 2011, Mohmeyer, et al.
U.S. Appl. No. 13/423,503, filed Mar. 19, 2012, Tomasi, et al.
U.S. Appl. No. 13/443,336, filed Apr. 10, 2012, Tomovic, et al.
U.S. Appl. No. 13/731,317, filed Dec. 31, 2012, Kampf.
U.S. Appl. No. 13/740,732, filed Jan. 14, 2013, Kampf.
U.S. Appl. No. 13/848,427, filed Mar. 21, 2013, Kampf.

\* cited by examiner

*Primary Examiner* — Melissa Rioja
(74) *Attorney, Agent, or Firm* — Oblon, Spivak, McClelland, Maier & Neustadt, L.L.P.

(57) ABSTRACT

The invention relates to a process for producing rigid polyurethane foams by reacting
a) polyisocyanates with
b) compounds having at least two hydrogen atoms which are reactive toward isocyanate groups in the presence of
c) blowing agents,
wherein the compounds b) having at least two hydrogen atoms which are reactive toward isocyanate groups comprise at least one aromatic polyester alcohol bi), at least one polyether alcohol bii) having a functionality of from 4 to 8 and a hydroxyl number in the range from 300 to 600 mg KOH/g.

19 Claims, No Drawings

PROCESS FOR PRODUCING RIGID POLYURETHANE FOAMS

The invention relates to a process for producing rigid polyurethane foams by reacting polyisocyanates with b) compounds having at least two hydrogen atoms which are reactive toward isocyanate groups.

Rigid polyurethane foams have been known for a long time and are used predominantly for heat and cold insulation, e.g. in refrigeration appliances, in hot water storages, in district heating pipes or in building and construction, for example in sandwich elements. A summary overview of the production and use of rigid polyurethane foams may be found, for example, in Kunststoff-Handbuch, Volume 7, Polyurethane 1st edition 1966, edited by Dr. R. Vieweg and Dr. A. Höchtlen, 2nd edition 1983, edited by Dr. Günter Oertel, and 3rd edition 1993, edited by Dr. Günter Oertel, Carl Hanser Verlag, Munich, Vienna.

They are usually produced by reacting polyisocyanates with compounds having at least two hydrogen atoms which are reactive toward isocyanate groups in the presence of catalysts, blowing agents and auxiliaries and/or additives.

Important requirements which rigid polyurethane foams have to meet are a low thermal conductivity, good flowability, satisfactory adhesion of the foam to the covering layers and good mechanical properties.

A further requirement which rigid polyurethane foams have to meet is good burning behavior. This is of great importance in, in particular, applications in the building sector, particularly in the case of composite elements comprising metallic covering layers and a core composed of polyurethane or polyisocyanurate foam. The term polyisocyanurate foam usually refers to a foam which comprises not only urethane groups but also isocyanurate groups. In the following, the term rigid polyurethane foam can also encompass polyisocyanurate foam.

Polyisocyanurate foams in particular frequently display unsatisfactory adhesion to the metallic covering layers. To remedy this deficiency, a bonding agent is usually applied between the covering layer and the foam, as described, for example, in WO 99/00559.

WO 2005090432 describes a process for producing rigid polyurethane foams produced using a mixture of a polyester alcohol based on an aromatic carboxylic acid and at least one polyether alcohol based on aromatic amines. The use of the polyester alcohols is said to reduce the thermal conductivity of the foam and improve the compatibility with the blowing agent. The foams produced by this process are preferably used in refrigeration appliances.

A further challenge which is always present in the use of rigid polyurethane foams is improving the flame resistance of the foams. Flame retardants are usually added to the foam for this purpose. The addition of the flame retardants can alter the mechanical properties and the processing properties of the foams. Furthermore, it is desirable to restrict the use of flame retardants, in particular those based on halogens, especially bromine, in the production of rigid polyurethane foams.

A further ongoing requirement is to improve the adhesion of the foams to the covering layers, in particular to reduce or completely avoid the use of bonding agents.

It was therefore an object of the invention to develop a process for producing rigid polyurethane foams which have good mechanical properties, good adhesion to covering layers and good flame resistance, have good compatibility with blowing agents and flame retardants and are readily processable.

The object has surprisingly been able to be achieved by a process for producing rigid polyurethane foams by reacting
a) polyisocyanates with
b) compounds having at least two hydrogen atoms which are reactive toward isocyanate groups in the presence of
c) blowing agents,
wherein the compounds b) having at least two hydrogen atoms which are reactive toward isocyanate groups comprise at least one aromatic polyester alcohol bi), at least one polyether alcohol bii) having a functionality of from 4 to 8 and a hydroxyl number in the range from 300 to 600 mg KOH/g.

The invention accordingly provides a process for producing rigid polyurethane foams by reacting
a) polyisocyanates with
b) compounds having at least two hydrogen atoms which are reactive toward isocyanate groups in the presence of
c) blowing agents,
wherein the compounds b) having at least two hydrogen atoms which are reactive toward isocyanate groups comprise at least one aromatic polyester alcohol bi), at least one polyether alcohol bii) having a functionality of from 4 to 8 and a hydroxyl number in the range from 300 to 600 mg KOH/g.

The hydroxyl number is determined in accordance with DIN 53240.

The hydroxyl number of the component b) is preferably at least 175 mg KOH/g, in particular at least 225 mg KOH/g.

Furthermore, the hydroxyl number of the component b) is preferably not more than 325 mg KOH/g, particularly preferably not more than 300 mg KOH/g, in particular not more than 290 mg KOH/g.

The polyester alcohol bi) preferably has a functionality of 2-3 and a hydroxyl number of from 200 to 300 mg KOH/g.

The polyester alcohol bi) is usually prepared by reacting carboxylic acids and/or derivatives thereof, in particular esters and anhydrides, with alcohols. The carboxylic acids and/or the alcohols, preferably both, are polyfunctional.

In an embodiment of the invention, the polyester alcohol bi) is prepared using at least one fatty acid or a fatty acid derivative, preferably a fatty acid.

The fatty acids can comprise hydroxyl groups. Furthermore, the fatty acids can comprise double bonds.

In an embodiment of the invention, the fatty acid does not comprise any hydroxyl groups. In a further embodiment of the invention, the fatty acid does not comprise any double bonds.

The average fatty acid content of the component b) is preferably greater than 1% by weight, more preferably greater than 2.5% by weight, more preferably greater than 4% by weight and particularly preferably greater than 5% by weight, based on the weight of the components b) and d).

The average fatty acid content of the component b) is preferably less than 30% by weight, more preferably less than 20% by weight, based on the total weight of the components b) and d).

The fatty acid or fatty acid derivative is preferably a fatty acid or fatty acid derivative based on renewable raw materials, selected from the group consisting of castor oil, polyhydroxy fatty acids, ricinoleic acid, hydroxyl-modified oils, grapeseed oil, black cumin oil, pumpkin kernel oil, borage seed oil, soybean oil, wheatgerm oil, rapeseed oil, sunflower oil, peanut oil, apricot kernel oil, pistacchio oil, almond oil, olive oil, macadamia nut oil, avocado oil, sea buckthorn oil, sesame oil, hemp oil, hazelnut oil, primrose oil, wild rose oil, safflower oil, walnut oil, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, linolenic acid, steridonic acid, arachidonic acid, timnodonic acid, clupanodonic acid and cervonic acid.

Preference is given to using oleic acid as fatty acid.

As described above, the polyester alcohol bi) is prepared using aromatic carboxylic acids or anhydrides thereof. In particular, these are selected from the group consisting of terephthalic acid, phthalic acid and phthalic anhydride.

In an embodiment of the invention, the polyester alcohol bi) is prepared using esters of aromatic carboxylic acids. In particular, these are selected from the group consisting of polyethylene terephthalate and dimethyl terephthalate. The polyethylene terephthalate can be a recycling product, in particular from the recycling of beverage bottles.

The polyester alcohol bi) is particularly preferably obtained using mixtures of carboxylic acids and derivatives thereof which comprise at least 50% by weight, based on the weight of the carboxylic acids, of terephthalic acid. In a further preferred embodiment of the invention, exclusively terephthalic acid is used as carboxylic acid.

Apart from the abovementioned carboxylic acids and derivatives thereof, it is also possible to use other known polyfunctional carboxylic acids, for example aliphatic carboxylic acids such as adipic acid or succinic acid. However, the content of these should be below 50% by weight, based on the weight of the carboxylic acids.

As alcohols for preparing the polyester alcohols bi), use is usually made of bifunctional alcohols such as ethylene glycol, diethylene glycol, polyethylene glycol, propylene glycol, 1,3-propanediol, 1,4-butanediol, 1,5-pentanediol, 1,6-hexanediol, 2-methyl-1,3-propanediol, 3-methyl-1,5-pentanediol and alkoxylates thereof, in particular ethoxylates thereof. In particular, the aliphatic diol is diethylene glycol.

In an embodiment of the invention, the polyester alcohol bi) has a content of components having a functionality of >2.9 of at least 200 mmol/kg of polyester alcohol, preferably at least 400 mmol/kg, particularly preferably at least 600 mmol/kg, especially at least 800 mmol/kg and in particular at least 1000 mmol/kg of polyester alcohol. Particular preference is given to the hydroxyl-comprising components used in the esterification. These are preferably more than bifunctional alcohols, higher-functional polyols selected from the group consisting of glycerol, alkoxylated glycerol, trimethylolpropane, alkoxylated trimethylolpropane, pentaerythritol and alkoxylated pentaerythritol.

In a further preferred embodiment of the invention, the component b) additionally comprises at least one polyether alcohol biii) having a functionality of from 2 to 4 and a hydroxyl number in the range from 100 to <300 mg KOH/g.

The polyether alcohols bii) and biii) are usually prepared by addition of alkylene oxides onto H-functional starter substances. This process is generally known and is routine for the preparation of such products.

As starter substances, it is possible to use alcohols or amines. As amines, it is possible to use aliphatic amines such as ethylenediamine. In another embodiment of the invention, aromatic amines, in particular toluenediamine (TDA) or mixtures of diphenylmethanediamine and polyphenylenepolymethylenepolyamines can be used. The component b) preferably comprises not more than 65% by weight, more preferably not more than 40% by weight, in each case based on the weight of the component a), of polyether alcohols based on aromatic amines.

In a particularly preferred embodiment of the invention, the component b) does not comprise any polyether alcohols based on aliphatic or aromatic amines.

Thus, polyfunctional alcohols are preferred as H-functional starter substances for the preparation of the polyether alcohols bii) and biii).

These are, in particular, 2- to 8-functional alcohols. Examples are glycols such as ethylene glycol or propylene glycol, glycerol, trimethylolpropane, pentaerythritol and also sugar alcohols such as sucrose or sorbitol. Mixtures of alcohols with one another are also possible. The solid starter substances such as sucrose and sorbitol, in particular, are frequently mixed with liquid starter substances such as glycols or glycerol.

2- to 3-functional alcohols, in particular glycerol or trimethylolpropane, are preferably used for preparing the polyols biii). To increase the functionality, higher-functional alcohols can also be added in small amounts.

To prepare the polyols bii), preference is given to using mixtures of high-functionality alcohols and the abovementioned alcohols which are liquid at room temperature, in particular glycerol. As high-functionality alcohols, preference is given to using sugar compounds such as glucose, sorbitol, mannitol and sucrose, polyhydric phenols, resols such as oligomeric condensation products of phenol and formaldehyde and Mannich condensates of phenols, formaldehyde and dialkanolamines and also melamine. Particular preference is given to sugar alcohols, in particular sucrose or sorbitol.

It has been found that the use of sorbitol-initiated polyether alcohols brings advantages in the processing and the properties of the foams. Thus, better curing and improved compressive strength are obtained.

As alkylene oxides, preference is given to using ethylene oxide, propylene oxide or mixtures of these compounds. Particular preference is given to using pure propylene oxide.

The addition of the alkylene oxides onto the starter substance is preferably carried out in the presence of catalysts. Basic compounds are usually used as catalysts, with the oxides and in particular the hydroxides of alkali metals or alkaline earth metals having attained the greatest industrial importance. Potassium hydroxide is usually used as catalyst.

In one embodiment of the invention, amines are used as catalysts for preparing the polyether alcohols bii) and biii), in particular the polyether alcohols bii). These are preferably amines having at least one tertiary amino group, imidazoles, guanidines or derivatives thereof. These amine catalysts preferably have at least one group which is reactive toward alkylene oxides, for example a primary or secondary amino group or, particularly preferably, a hydroxyl group. These catalysts are particularly preferably amino alcohols such as dimethylethanolamine. Such catalysts are used particularly when starter substances comprising sucrose are employed.

In a preferred embodiment of the invention, the weight ratio of the component bi) to the sum of the components bii) and biii) is less than 4.

Furthermore, the weight ratio of the component bi) to the sum of the components bii) and biii) is preferably greater than 0.15.

As blowing agents, it is possible to use chemical and physical blowing agents. Chemical blowing agents are compounds which react with isocyanate groups to eliminate gases, in particular carbon dioxide or carbon dioxide and carbon monoxide. These are usually water and/or formic acid, preferably water.

In place of or in combination with the chemical blowing agents, it is also possible to use physical blowing agents. These are compounds which are inert toward the starting components and are usually liquid at room temperature and vaporize under the conditions of the urethane reaction. The boiling point of these compounds is preferably below 50° C. The physical blowing agents also include compounds which are gaseous at room temperature and are introduced under pressure into the starting components or are dissolved therein, for example carbon dioxide, low-boiling alkanes and fluoroalkanes.

The blowing agents are usually selected from the group consisting of water, formic acid, alkanes and cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

Mention may be made by way of example of propane, n-butane, isobutane and cyclobutane, n-pentane, isopentane and cyclopentane, cyclohexane, dimethyl ether, methyl ethyl ether, methyl butyl ether, methyl formate, acetone and also fluoroalkanes which can be degraded in the troposphere and therefore do not damage the ozone layer, e.g. trifluoromethane, difluoromethane, 1,3,3,3-pentafluoropropene, 1,1,1,3,3-pentafluorobutane, 1,1,1,3,3-pentafluoropropane, 1,1,1,2-tetrafluoroethane, 1,1,1,2,3-pentafluoropropene, 1-chloro-3,3,3-trifluoropropene, difluoroethane and heptafluoropropane. The physical blowing agents mentioned can be used either alone or in any combinations with one another.

Particularly preferred physical blowing agents are fluoroalkanes and/or hydrocarbons.

The blowing agent component c) is usually used in an amount of from 2 to 45% by weight, preferably from 2 to 30% by weight, particularly preferably from 2 to 20% by weight, based on the total weight of the components b) to e).

In a preferred embodiment, the blowing agent mixture c) comprises exclusively hydrocarbons as physical blowing agent. Particularly preferred hydrocarbons are n-pentane, cyclopentane, isopentane and mixtures of the isomers. In particular, a mixture of n-pentane and isopentane is used as physical blowing agent c).

In a preferred embodiment of the invention, a flame retardant d) is additionally used. The flame retardant d) is preferably used in an amount of from 10 to 55% by weight, based on the total weight of the components b) and d).

The flame retardant d) can comprise hydrogen atoms which are reactive toward isocyanate groups. In a preferred embodiment of the invention, the flame retardant does not comprise any hydrogen atoms which are reactive toward isocyanate groups.

Preference is given to using flame retardants d) which comprise at least one phosphorus atom in the molecule.

They can preferably be the products characterized in more detail below.

A preferred group comprises phosphorus-comprising compounds having a molecular weight of less than 400 g/mol, especially less than 300 g/mol, preferably less than 200 g/mol and particularly preferably in the range from 150 to 190 g/mol, and less than 4 phosphorus atoms, especially less than 3 phosphorus atoms, more especially less than 2 phosphorus atoms and in particular 1 phosphorus atom, in the molecule. Preference is given to phosphonates and/or phosphates. Particular preference is given to using phosphates and phosphonates selected from the group consisting of diethyl ethanephosphonate (DEEP), dimethyl propylphosphonate (DMPP) and triethyl phosphate (TEP), particularly preferably from the group consisting of diethyl ethane phosphonate (DEEP) and triethyl phosphate (TEP) and in particular diethyl ethanephosphonate (DEEP). These compounds are preferably used in an amount of from 5 to 40% by weight, based on the sum of the masses of b) and d).

A further preferred group of phosphorus-comprising compounds comprises compounds of this type having a molecular weight of greater than 300 g/mol. These preferably have at least one phosphorus atom in the molecule. Preference is given to phosphonates and/or phosphates, especially phosphates. Preference is given to using diphenyl cresyl phosphate (DPC) and/or triphenyl phosphate, in particular diphenyl cresyl phosphate. These compounds are preferably used in an amount of from 10 to 30% by weight, based on the sum of the masses of b) and d).

As regards the other compounds used for the process of the invention, the following details may be provided:

As polyisocyanates a), use is made of the customary aliphatic, cycloaliphatic and in particular aromatic diisocyanates and/or polyisocyanates. Preference is given to using tolylene diisocyanate (TDI), diphenylmethane diisocyanate (MDI) and in particular mixtures of diphenylmethane diisocyanate and polyphenylenepolymethylene polyisocyanates (crude MDI). The isocyanates can also be modified, for example by incorporation of uretdione, carbamate, isocyanurate, carbodiimide, allophanate and in particular urethane groups.

In particular, crude MDI is used for producing rigid polyurethane foams.

In the prior art, it is customary, if appropriate, to incorporate isocyanurate groups into the polyisocyanate. The formation of isocyanurate groups leads to an improvement in the flame resistance of the foams. The isocyanurate groups are preferably formed by addition of specific catalysts during the reaction to produce the foam.

Furthermore, the component b) can optionally comprise chain extenders and/or crosslinkers. Chain extenders and/or crosslinkers used are, in particular, bifunctional or trifunctional amines and alcohols, in particular diols and/or triols having molecular weights of less than 400, preferably from 60 to 300.

In addition to the components a) to d), the customary catalysts, foam stabilizers and auxiliaries and/or additives can be used.

As catalysts, preference is given to using tertiary amines, tin catalysts or alkali metal salts. It is also possible to allow the reactions to proceed without catalysis. In this case, the catalytic activity of amine-initiated polyols is exploited. Catalysts which catalyze the formation of isocyanurate groups include carboxylates of alkali metals.

Foam stabilizers are substances which promote the formation of a regular cell structure during foam formation.

Examples which may be mentioned are: silicone-comprising foam stabilizers such as siloxane-oxyalkylene copolymers and other organopolysiloxanes. Also alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidene, bisphenol A, alkylated bisphenol A, polyvinyl alcohol and also further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidene, formaldehyde and naphthol, formaldehyde and alkylnaphthol and also formaldehyde and bisphenol A. As alkoxylation reagents, it is possible to use, for example, ethylene oxide, propylene oxide, polyTHF and higher homologues.

Further details regarding the abovementioned and further starting materials may be found in the specialist literature, for example Kunststoffhandbuch, Volume VII, Polyurethane, Carl Hanser Verlag, Munich, Vienna, 1st, 2nd and 3rd editions 1966, 1983 and 1993.

To produce the rigid polyurethane foams, the polyisocyanates a) and the components b) to d) and also the other compounds used for the production of the polyurethanes are reacted in such amounts that the isocyanate index of the foam is from 90 to 350, preferably from 100 to 250, more preferably from 110 to 200 and especially from 120 to 200, and in particular from 160 to 200.

The rigid polyurethane foams can be produced batchwise or continuously with the aid of known processes, for example by means of the double belt process. Particular preference is given to processing of the rigid polyurethane foams according to the invention by means of a continuous double belt.

It has been found to be particularly advantageous to employ the two-component process and combine the compounds having at least two hydrogen atoms which are reactive toward isocyanate groups with the blowing agents, foam stabilizers and flame retardants and also the optional catalysts and auxiliaries and/or additives to form a polyol component and react this with the polyisocyanates or mixtures of the polyisocyanates and optionally blowing agents, also referred to as isocyanate component.

The rigid polyurethane foams of the invention have good mechanical and processing properties. They adhere very well to the surface of the substrates. Furthermore, they have good flame resistance.

The invention is illustrated by the following examples.

Starting Materials

Polyesterol 1: Esterification product of phthalic anhydride, diethylene glycol and monoethylene glycol having a hydroxyl functionality of 2.0 and a hydroxyl number of 240 mg KOH/g Polyesterol 2: Esterification product of terephthalic acid, diethylene glycol, trimethylolpropane and oleic acid having a hydroxyl functionality of 2.3 and a hydroxyl number of 245 mg KOH/g Polyetherol 1: Polyether polyol having a hydroxyl number of 490 mg KOH/g, prepared by polyaddition of propylene oxide onto a sucrose/glycerol mixture as starter molecule Polyetherol 2: Polyether polyol having a hydroxyl number of 490 mg KOH/g, prepared by polyaddition of propylene oxide onto a 72% strength aqueous sorbitol solution as starter molecule Polyetherol 3: Polyether polyol having a hydroxyl number of 160 mg KOH/g, prepared by polyaddition of propylene oxide onto trimethylolpropane Polyetherol 4: Polyether polyol prepared by polyaddition of ethylene oxide onto ethylene glycol and having a hydroxyl functionality of 2 and a hydroxyl number of 190 mg KOH/g Polyetherol 5: Polyether polyol prepared by polyaddition of propylene oxide onto propylene glycol and having a hydroxyl functionality of 2 and a hydroxyl number of 104 mg KOH/g TCPP: tris-2-chloroisopropyl phosphate Stabilizer: Niax® Silicone L 6635 (silicone-comprising stabilizer) from Momentive B Component Polymeric MDI (Lupranat® M50) having an NCO content of 31% and a viscosity of 500 mPas at 25° C.

Additives

DMCHA Dimethylcyclohexylamine

Catalyst 2: 47% strength potassium acetate solution in 95% strength monoethylene glycol Water 5.5 parts of an n-pentane/isopentane mixture in a ratio of 80:20

Measurement Methods:

Curing

Curing was determined by means of the indentation test. For this purpose, a steel indenter having a hemispherical end having a radius of 10 mm was pressed by means of a tensile/compressive testing machine to a depth of 10 mm into the foam body formed at times of 2.5, 3, 4, 5, 6 and 7 minutes after mixing of the components in a polystyrene cup. The maximum force in N required for this is a measure of the curing of the foam. As a measure of the brittleness of the rigid polyisocyanurate foam, the time at which the surface of the rigid foam had visible fracture zones during the indentation test was determined.

Flame Resistance

The flame height was measured in accordance with EN ISO 11925-2.

The hydroxyl numbers were determined in accordance with DIN 53240.

Adhesion:

The adhesion was determined by means of a peel adhesion test. For this purpose, a test specimen was produced in a closed box mold which had the dimensions 200 mm×200 mm×200 mm and whose temperature could be controlled. The test specimen is produced in such a way that the foam has a degree of compaction of 1.15±0.3. In addition, an aluminum-coated paper is placed in the bottom before foaming. After 5 minutes, the test specimen is removed from the mold. After storage for 24 hours, the aluminum paper on the underside is cut with parallel cuts with the aid of a template. The parallel strip is pulled off to a distance of about 3 cm and clamped in a testing device in a Zwick tensile testing machine. The tensile testing machine then pulls the foil strip off at a uniform speed of 100 mm/min. A force transducer is integrated into the tensile apparatus to measure the force required for pulling off the foil and thus the peel adhesion value.

The peel adhesion values indicated below are the arithmetic mean of 2 independent repeat tests.

Flexural Strength:

The flexural strength was determined by means of a 3-point bending test using a method based on DIN 53423. Three test specimens having the dimensions 120 mm×25 mm×20 mm are sawn from a foam cube having an edge length of 20 cm. In the bending test, the test specimen is positioned on two supports having a spacing of 100 mm and a single force F is applied in the middle. As measurement results, the flexure and also the force at fracture or at 20 mm flexure are determined. The flexural strength is calculated therefrom as the ratio of bending moment in the middle of the test specimen at fracture and the resistance moment of its cross section.

Production of the Rigid Polyurethane Foams

The isocyanates and the components which are reactive toward isocyanate were foamed together with the blowing agents, catalysts and all further additives at a constant molar ratio of OH to NCO functions of 100:153+/−6. A constant fiber time of 49+/−1 seconds was in each case set by varying the amount of DMCHA and an overall foam density of 38.5+/−1 g/l was in each case set by varying the amount of water. The amount of catalyst 2 was kept constant at 1.5% by weight and that of pentane was kept constant at 5.5% by weight, based on 100% by weight of the mixture of the polyester alcohols and polyether alcohols and the flame retardant and stabilizer and also 0.5 part of water.

TABLE 1

Effect of an excessively high hydroxyl number of the polyol mixture

|  | Example 1 | Comparative example 1 |
|---|---|---|
| Polyesterol 2 | 39 | 16 |
| Polyetherol 1 | 27.5 | 50.5 |
| Polyetherol 4 | 5.5 | 5.5 |
| Polyetherol 5 |  |  |
| TCPP | 25 | 25 |
| Water | 0.5 | 0.5 |
| Stabilizer | 2.5 | 2.5 |
| Polyol OHN | 271 | 328 |
| B2 determination [cm] |  |  |
| $1^{st}$ value | 11 | 15 |
| $2^{nd}$ value | 9 | 16 |
| $3^{rd}$ value | 10 | 15 |
| $4^{th}$ value | 11 | 16 |
| B2 mean [cm] | 10.25 | 15.5 |

Table 1 shows that excessively high OH numbers of the polyol component have an adverse effect on the flame resistance.

TABLE 2

Effect of an excessively low hydroxyl number of the polyol mixture or the absence of a polyether alcohol bii)

|  | Example 1 | Comparative example 2 | Comparative example 3 | Comparative example 4 |
|---|---|---|---|---|
| Polyesterol 2 | 39 | 39 | 72 | 66.5 |
| Polyetherol 1 | 27.5 |  |  |  |
| Polyetherol 4 | 5.5 | 5.5 |  | 5.5 |
| Polyetherol 5 |  | 27.5 |  |  |
| TCPP | 25 | 25 | 25 | 25 |
| Water | 0.5 | 0.5 | 0.5 | 0.5 |
| Stabilizer | 2.5 | 2.5 | 2.5 | 2.5 |
| Polyol OHN | 271 | 165 | 208 | 204 |
| Indentation test [N] |  |  |  |  |
| 2.5 min | 47 | 19 | 30 | 34 |
| 3 min | 61 | 23 | 38 | 43 |
| 4 min | 80 | 30 | 55 | 58 |
| 5 min | 97 | 37 | 67 | 69 |
| 6 min | 108 | 42 | 73 | 82 |
| 7 min | 119 | 46 | 84 | 88 |
| Peel adhesion [N] | 9.4 | 5.8 | 5.2 | 3.8 |

Table 2 shows that excessively low OH numbers of the polyol component or the absence of the polyether alcohol bii) have an adverse effect on the peel adhesion and curing.

TABLE 3

Effect of the use of a polyether alcohol having a low functionality and a low hydroxyl number

|  | Example 1 | Example 5 |
|---|---|---|
| Polyesterol 2 | 39 | 39 |
| Polyetherol 1 | 27.5 | 33 |
| Polyetherol 3 |  |  |
| Polyetherol 4 | 5.5 |  |
| Polyetherol 5 |  |  |
| TCPP | 25 | 25 |
| Water | 0.5 | 0.5 |
| Stabilizer | 2.5 | 2.5 |
| Polyol OHN | 271 | 288 |
| B2 determination [cm] |  |  |
| $1^{st}$ value | 11 | 12 |
| $2^{nd}$ value | 9 | 13 |
| $3^{rd}$ value | 10 | 12 |

TABLE 3-continued

Effect of the use of a polyether alcohol having a low functionality and a low hydroxyl number

|  | Example 1 | Example 5 |
|---|---|---|
| $4^{th}$ value | 11 | 14 |
| B2 mean [cm] | 10.25 | 12.75 |
| Peel adhesion [N] | 9.4 | 8.7 |

Table 3 shows that the use of a low-functionality polyether having a low hydroxyl number in the polyol component improves the fire resistance and peel adhesion of the foam.

TABLE 4

Effect of the use of an oleic acid-based polyester alcohol

|  | Example 2 | Example 6 |
|---|---|---|
| Polyesterol 1 |  | 39.5 |
| Polyesterol 2 | 39 |  |
| Polyetherol 1 | 22.5 | 27.5 |
| Polyetherol 3 | 5 | 5 |
| Polyetherol 4 | 5.5 |  |
| TCPP | 25 | 25 |
| Water | 0.5 | 0.5 |
| Stabilizer | 2.5 | 2.5 |
| B2 determination [cm] |  |  |
| $1^{st}$ value | 12 | 12 |
| $2^{nd}$ value | 12 | 13 |
| $3^{rd}$ value | 10 | 13 |
| $4^{th}$ value | 11 | 12 |
| B2 mean | 11.25 | 12.5 |
| Peel adhesion [N] | 9.3 | 5.9 |

Table 4 shows that the use of an oleic acid-based ester significantly improves the adhesion. Furthermore, this table shows that the use of a terephthalic acid-based ester significantly improves the burning behavior.

TABLE 5

Effect of the use of a sorbitol-initiated polyether alcohol

|  | Example 1 according to the invention | Comparative example 7 |
|---|---|---|
| Polyesterol 2 | 39 | 39 |
| Polyetherol 1 | 27.5 |  |
| Polyetherol 2 |  | 27.5 |
| Polyetherol 4 | 5.5 | 5.5 |
| TCPP | 25 | 25 |
| Water | 0.5 | 0.5 |
| Stabilizer | 2.5 | 2.5 |
| Polyol OHN | 271 | 271 |
| Indentation test [N] |  |  |
| 2.5 min | 47 | 50 |
| 3 min | 61 | 65 |
| 4 min | 80 | 84 |
| 5 min | 97 | 99 |
| 6 min | 108 | 115 |
| 7 min | 119 | 116 |
| Flexural strength [N/mm$^2$] | 0.17 | 0.21 |

Table 5 shows that the use of a sorbitol-initiated polyether alcohol in the polyol component improves the curing and the flexural strength.

The invention claimed is:

1. A process for producing rigid polyurethane foams, comprising:

reacting polyisocyanates (a) with compounds (b) having at least two hydrogen atoms which are reactive toward isocyanate groups in the presence of blowing agents (c), and a flame retardant (d), wherein the compounds (b) having at least two hydrogen atoms which are reactive toward isocyanate groups comprise:

at least one aromatic polyester alcohol (bi), which is prepared using a fatty acid, at least one polyether alcohol (bii) having a functionality of from 4 to 8, and a hydroxyl number in the range from 300 to 600 mg KOH/g, and at least one polyether alcohol (biii) having a functionality of from 2 to 4 and a hydroxyl number in the range from 100 to less than 300 mg KOH/g, wherein a weight ratio of the at least one aromatic polyester alcohol (bi) to a sum of the at least one polyether alcohol (bii) and the at least one polyether alcohol (biii) is from greater than 0.15 to less than 4, and the average content of the fatty acid of the compounds (b) is greater than 1% by weight and less than 30% by weight based on a total weight of the compounds (b) and the flame retardant (d).

2. The process according to claim 1, wherein a hydroxyl number of the compounds (b) is at least 175 mg KOH/g.

3. The process according to claim 1, wherein a hydroxyl number of the compounds (b) is not more than 325 mg KOH/g.

4. The process according to claim 1, wherein the aromatic polyester alcohol (bi) has a functionality of from 2 to 3 and a hydroxyl number of from 200 to 300 mg KOH/g.

5. The process according to claim 1, wherein the aromatic polyester alcohol (bi) is prepared using an aromatic carboxylic acid in addition to said fatty acid.

6. The process according to claim 5, wherein the aromatic carboxylic acid is selected from the group consisting of terephthalic acid, phthalic acid and phthalic anhydride.

7. The process according to claim 1, wherein the aromatic polyester alcohol (bi) is prepared using esters of aromatic carboxylic acids in addition to said fatty acid.

8. The process according to claim 7, wherein the esters of aromatic carboxylic acids are selected from the group consisting of polyethylene terephthalate and dimethyl terephthalate.

9. The process according to claim 6, wherein the aromatic carboxylic acid is terephthalic acid.

10. The process according to claim 5, wherein at least 50% by weight of the aromatic carboxylic acid is terephthalic acid.

11. The process according to claim 1, wherein the at least one polyester alcohol (bi) comprises at least 200 mmol/kg of a polyester alcohol having a functionality equal to or greater than 2.9.

12. The process according to claim 1, wherein the blowing agents (c) comprise a hydrocarbon.

13. The process according to claim 1, wherein the amount of the flame retardant (d) is from 10 to 55% by weight, based on the total weight of the compounds (b) and the flame retardant (d).

14. The process according to claim 1, wherein the flame retardant does not comprise any groups which are reactive toward isocyanate groups.

15. The process according to claim 1, wherein the flame retardant is a compound which comprises phosphorus.

16. A rigid polyurethane foam obtained according to claim 1.

17. The process according to claim 1, wherein the fatty acid comprises oleic acid.

18. The process according to claim 1, wherein the average content of the fatty acid of the compounds (b) is greater than 5% by weight and less than 20% by weight based on the total weight of the compounds (b) and the flame retardant (d).

19. The process according to claim 18, wherein the fatty acid comprises oleic acid.

* * * * *